Figure 1:
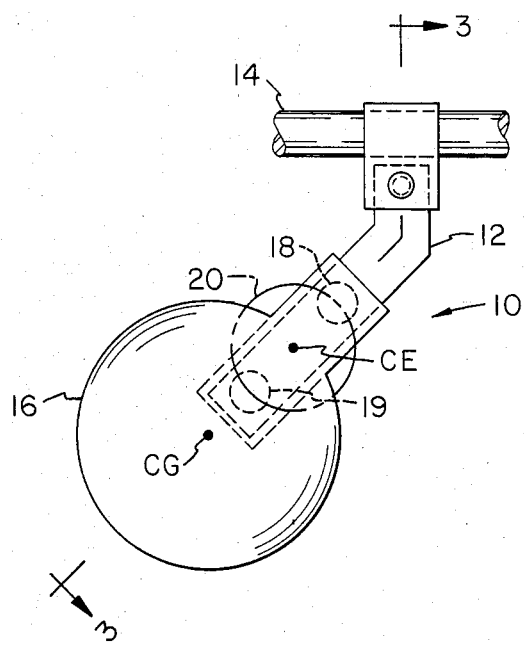

United States Patent [19]

Rawlins

[11] Patent Number: 4,523,053

[45] Date of Patent: Jun. 11, 1985

[54] VIBRATION DAMPER

[75] Inventor: Charles B. Rawlins, Massena, N.Y.

[73] Assignee: Aluminum Company of America, Pittsburgh, Pa.

[21] Appl. No.: 565,179

[22] Filed: Dec. 23, 1983

[51] Int. Cl.³ .............................................. H02G 7/14
[52] U.S. Cl. ...................................... 174/42; 188/379
[58] Field of Search ................... 174/42; 188/266, 268, 188/378, 379; 248/609, 611, 636; 267/136, 141, 141.1

[56] References Cited

U.S. PATENT DOCUMENTS

| | | | |
|---|---|---|---|
| 2,271,935 | 2/1942 | Buchanan et al. | 174/42 |
| 3,478,160 | 11/1969 | Reed | 174/42 |
| 3,748,370 | 7/1973 | Dalia | 174/42 |

FOREIGN PATENT DOCUMENTS 342599  1/1960  Switzerland ........................... 174/42

Primary Examiner—Laramie E. Askin
Attorney, Agent, or Firm—Elroy Strickland

[57] ABSTRACT

A device for damping vibration of a structure subject to vibration, the device including a member for clamping to the structure and having a portion engaging elastomer means for dissipating the energy of vibration. The elastomer means comprises two elastomer pads or structures concentrated at diametrically opposed locations on a circle of effort, and an inertial weight engaging and suspended by the elastomer structures. The weight is located on opposed sides of the clamping member such that the elastomer structures are sandwiched between the weight and clamping member.

3 Claims, 4 Drawing Figures

U.S. Patent    Jun. 11, 1985    4,523,053

VIBRATION DAMPER

BACKGROUND OF THE INVENTION

The subject invention relates generally to a novel concept and device employing elastomers as the mechanism for damping the vibrations of structures subject to vibration.

The best known and commercially successful seismic device for damping overhead conductors is the Stockbridge damper. Such a damper comprises a stranded steel cable, two weights attached respectively to the ends of the cable and a conductor clamp attached to the cable at a location intermediate the weights. With vibration of the conductor, the inertia of the weights causes working of the cable such that friction between the strands of the cable dissipates the energy of vibration to the surrounding atmosphere in the form of heat. The Stockbridge damper has two resonant modes of motion, with each mode combining rotation and vertical translation of the weight in differing proportions.

In U.S. Pat. No. 3,478,160 to Reed, a single elastomer bushing is employed to support a mass from an overhead conductor in a manner that locates the center of gravity of the mass in three mutually orthogonal planes that are offset from the center of suspension of the mass. Such a device provides "coupled" modes of vibration that offer damping at different frequencies of vibration of an overhead conductor.

In designing the damper of the subject invention, approximations of seismic mass, radius of gyration of the mass, the location of the center of gravity of the mass and certain other dimensions were determined by computer simulation. The simulation indicated that the dimensions of a good damping device required a certain spring constant for both vertical and horizontal translation of the mass with respect to its supporting clamp as well as a certain rotational spring constant. When these several spring constants were sought in a practical construction, it was found that they could not be obtained simultaneously except in a very singular configuration.

It should be understood that damping elastomers were intended for use as the spring-like elements of the subject invention because such materials incorporate sufficient hysteresis in their characteristics that no other source of energy dissipation is needed. These materials also lend themselves to easy and economical fabrication in any desired shape. However, the damping capabilities of elastomers are greatest when they are deflected in shear rather than extension, such that they are best applied in the form of pads that couple bodies at opposed and parallel surfaces of said bodies, the surfaces being chosen such that the relative motions between them that occur during vibratory service induce only shearing of the pads, and not compression, extension or rocking. The pads are of uniform thickness to fill the space between the opposed and parallel surfaces, but their cross-sectional shapes (in planes parallel to those surfaces) are generally not restricted by considerations of damping effectiveness. Shapes that are easy to fabricate are ordinarily employed. For example, the elastomer pads used for suspending the engines in many cars are square or rectangular in cross section.

It should also be understood that where the spring constant and strength of an elastomer pad are important, choices and compromises may be made among (1) the elastomer composition, (2) the thickness of the pad and (3) the cross-sectional area of the pad. The multiplicity of options available generally assures that a small number of required characteristics (spring constant and strength) can be satisfactorily provided. This ease of achieving a desired combination of characteristics was not forthcoming in the selection of pads for the subject invention, however. The requirement that the rotational spring constant of the elastomer suspension have a certain value or, more exactly, have a certain ratio to the translational spring constant, severely restricted the choice as to the configuration of the elastomer pads.

The restriction reflected the conflict between three requirements. The first was the requirement that the ratio of rotational to translational spring constants have a certain value. Now this ratio is equal in practice to the mean-square radius of the pad's cross section. For example, if the pad takes the form of a thin ring of a certain radius, then the ratio of rotational to translational spring constants is the square of that radius. For cross sections having other shapes, the calculation of mean-square radius is more complicated, but mathematical tables exist that provide such information for many shapes.

The second requirement contributing to the conflict had to do with the strength of the pads. Two types of strength were of concern. One was the strength with respect to the vibratory motions the damper would experience. These movements would subject the pad to shearing and could lead to tearing or of fatigue of the elastomer were the shear strains in the elastomer too great. These strains can be minimized by using pads of generous thickness so that the relative movements of the opposed parallel surfaces can be absorbed by a large thickness of elastomer material. The other strength requirement becomes of concern when the pad is of such great thickness, but small cross section, that it may be considered to be a column or a wall subject to buckling. The most convenient means of assembly for the dampers of the invention is often to compress them together in the form of a sandwich with the pads held in place by compression, as will be discussed below. The likelihood of buckling the pads may be minimized by using pads of generally squat shape.

These two strength aspects in combination lead to use of pads that are thick and squat, that is, with diameter equal to or greater than, say, half the thickness. The requirement for a certain rotational to translational spring constant ratio means that this diameter must exceed twice the square root of that ratio.

The third requirement contributing to the conflict was the fact that elastomers having desirable properties over a broad enough range of temperatures to make them suitable for use on transmission lines also were fairly stiff, that is, they had fairly high modulus of shear. The effect of this was that pads with great enough diameter to satisfy spring constant ratio requirements and small enough in thickness to be considered squat were also much too stiff.

Consideration was given to configuring the pad as a ring so as to reduce its stiffness by reducing the area of the pad. The ratio of spring constants could then be preserved by giving the ring a radius equal to the square root of the ratio of natural frequencies. When the area was sufficiently reduced using this procedure, however, the wall thickness of the ring (in the radial direction) became small compared with the pad thickness, and the danger arose of wall collapse occurring similar to what happens when one steps on the end of a beverage can. It was this combination of constraints that comprised the problem which the present invention addresses.

The severity of the problem was aggravated by the fact that practical design militates in favor of utilizing not one but two pads in the damper so that the inertial mass may be fabricated in two halves which on assembly embrace between them the two elastomer pads which in turn embrace between them a tongue, extension or arm of the conductor-engaging clamp. In such a structure, doubling the number of pads doubles the effective spring constants of the elastomer suspension because the pads act mechanically in parallel. To regain the spring constants afforded by a single pad, it is necessary to double the thickness of each of the two pads thus making their walls even more prone to buckling.

SUMMARY OF THE INVENTION

The cure for this problem, which is a primary objective of the invention, is to concentrate damping pad area in two, opposed columns separated by the root-mean square radius of the above pad. Such a shape yields the most stable column for carrying a compression load and for holding a sandwich structure together. The use of the fewest number of such columns provides the greatest stability associated with "squatness" that can be had with a limited amount of pad area. Two such pads or columns is the minimum number that can spread the feet of the elastomer to the desired radius.

Another objective of the invention is to achieve in combination, which has heretofore been unobtainable, (1) a translational spring constant, (2) a predetermined ratio of rotational to translational spring constants and (3) a suitable strength in the elastomer suspension, as required by the above computer analysis. A result of this is a highly compact and efficient damping device.

The concentrated elastomer pads or structures of the invention are located on a circle of effort that lies in a plane that contains relative vertical and horizontal degrees of freedom for the inertial weight or mass of the device and the arm of a clamping means. The elastomer structures are sandwiched between the arm and the inertial weight and support the weight on the arm. The center of gravity of the weight is offset from the vertical at an angle of 40° to 50° and spaced from the center of the circle of effort, such that with vertical movement of the structure to which the device is attached a shearing motion is applied to the elastomer structures in a vertical direction. Shearing motion is also applied in a horizontal direction by virtue of the offset center of gravity of the mass working against the clamp arm. The offset center of gravity of the weight also converts vertical motion of the weight to a rotational motion about the center of the circle of effort of the damping structures and in the plane of the vertical and horizontal; this results in a torsional or twisting action of the elastomer structures. Thus, the motions that the weight of the damper execute during vibratory service, with respect to the supporting clamp arm or extension, are vertical and horizontal motion and rotational motion, all of these in the plane in which the elastomer pads are sheared. The spring constants with which the elastomer pad system restrains and controls these motions are the primary concern of the invention. The invention permits the combination of spring constants, shown to be desirable by computer simulation, to be realized in practice.

THE DRAWINGS

Figure 2:
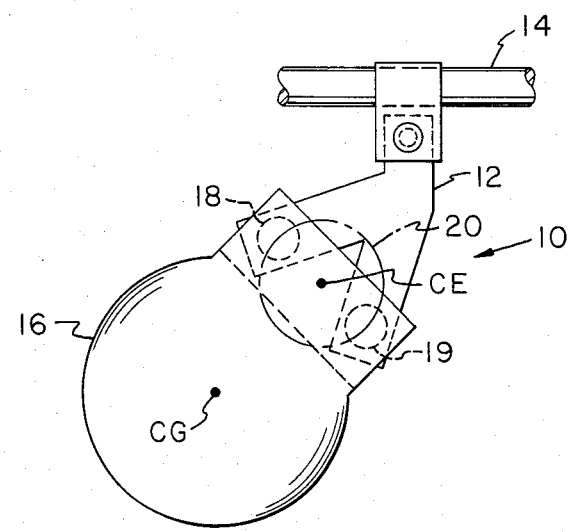
Figure 3:
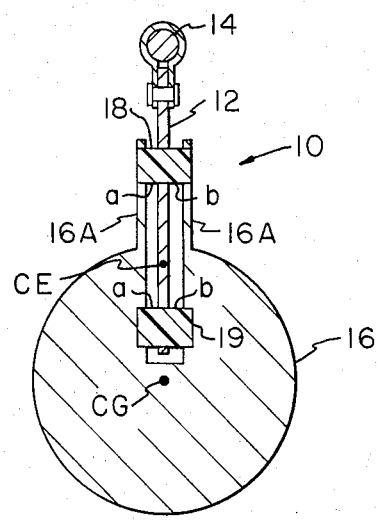
Figure 4:
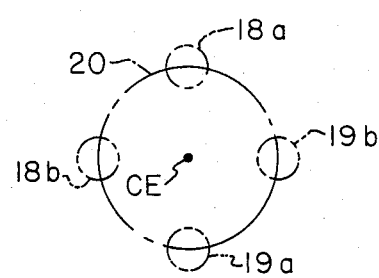

The present invention will best be understood from consideration of the following detailed discussion in connection with the accompanying drawings in which:

FIGS. 1 and 2 thereof show schematically side elevation views of two embodiments of the invention;

FIG. 3 is a diagrammatic cross-sectional view of the damping device of the invention, taken in the direction of the lines 3—3 of FIG. 1; and FIG. 4 shows schematically four elastomer damping structures located on a circle of damping effort.

PREFERRED EMBODIMENT

Referring now to FIGS. 1 to 3 of the drawings, a damping device 10 of the invention is shown diagrammatically. The device comprises means 12 having one end for clamping to a structure 14 subject to vibration in a vertical direction, such as an overhead electrical conductor, and another end (or ends in FIG. 2) supporting an inertial weight member or mass 16. Supporting the weight member on the clamp means, or clamp arm, are at least two, spaced apart elastomer pads or structures 18 and 19; this is best seen in the cross-sectional view of the device depicted in FIG. 3. More particularly, the weight member is spaced from the clamp means such that a space is provided on opposed sides of the clamp means to accommodate the elastomers. This provides a sandwich structure comprising the weight on the outside, as two outside layers 16A of the sandwich, and the clamp 12 as a middle or intermediate layer. Between these three layers are located the elastomer pads to complete the sandwich. The elastomers may be divided in two (as schematically indicated by the letters a and b in FIG. 3), or 18 and 19 may be integral pads extending through openings (as illustrated in FIG. 3) provided in arm 12.

Elastomers 18 and 19 are, in addition, diametrically located on a circle of effort 20 (shown in dash outline in FIGS. 1 and 2) having a center of effort CE when work is performed on the elastomers, as explained hereinafter, to provide damping. The radius of the circle of effort 20 is that of the mean-square radius of the damping pad discussed above to provide the desired ratio of rotational to translational spring constants. The shape of elastomers 18 and 19 (on circle 20) is columnar to provide the strength needed for damping devices. The length of the column is relatively short to provide a relatively squat structure to minimize the tendency to buckle, as discussed above.

Hence, by appropriate dimensions chosen for elastomers 18 and 19 and by concentrating the same on a circle of effort 20 having a diameter that is equal to or exceeds twice the square root of the above-required ratio for rotational to translational spring constants, a relatively strong yet compliant structure is provided to allow working of the elastomers.

Weight 16 is positioned relative to the elastomers such that its center of gravity CG is spaced from but in line with the center of effort CE of the elastomers and offset therefrom at an angle of between 40° and 50° with respect to the vertical and horizontal. This provides the weight with an effective lever and the elastomers with substantially equal spring constants for purely vertical and purely horizontal displacement of the clamp means and weight when structure 14 vibrates. In addition, rotational movement of the weight about the center of effort of the elastomers and in the plane of their circle of effort is provided when 14 vibrates, as the weight has a certain moment of inertia in a plane parallel to that of the circle of effort.

FIGS. 1 and 2 show embodiments in which the elastomers 18 and 19 occupy two different positions on the circle of effort 20. The locations of the elastomers on the circle are immaterial for purposes of the invention other than that they must be lumped or concentrated in diametrically opposed locations on the circle, and that the center of gravity CG of weight 16 be located on a line extending through the center of the circle that lies at the above angle of between 40° and 50°.

For example, if the two elastomer pads 18 and 19 shown in the cross-sectional view presented in FIG. 3 actually comprise four elements, i.e., two (18a and 19a, and 18b and 19b) on each side of clamp arm 12, the two pads on each side must be diametrically opposed on the circle of effort, but the two on one side may be rotated from the other; in FIG. 4 they are rotated 90° though any degree of rotation or no rotation will provide effective and efficient damping.

The size (mass) of 16 and the length of its lever arm (from CE) are such that with vertical vibration of the structure (14) to which device 10 is attached and the resulting vibrating motion of clamp arm 12, the inertia of 16 places the elastomer structures in shear; this works the elastomers at the frequency of the vibration thereby producing heat (hysteresis losses) in the elastomers; the heat is dissipated to the atmosphere at a rate greater than the rate at which the wind supplies energy to the structure if the structure is an overhead conductor. In this manner, vibration of 14 is damped.

More particularly, vibrating motion of the weight 16 in working the elastomers is vertical, horizontal and/or rotational, the above ratio of rotational to translational spring constants providing a high degree of damping efficiency.

While the invention has been described in terms of preferred embodiments, the claims appended hereto are intended to encompass all embodiments which fall within the spirit of the invention.

What is claimed is:

1. A compact vibration damping device comprising: an arm of a clamping means, and
    an inertial weight member suspended from said arm, the damping device including further:
    a system for suspending the weight member from the arm, the system comprising at least two diametrically opposed elastomer pads having predetermined spring constants respectively for relative translational motion of the weight member and arm and for relative rotational motion of the weight member and arm,
    the elastomer pads being sandwiched between the weight member and arm and disposed in a plane that contains relative vertical and horizontal degrees of freedom for the weight member and arm such that the pads undergo shearing motion with relative movement of the weight member and arm,
    the distance between the pads being substantially equal to twice the square root of the ratio of the rotational to the translational spring constants of the elastomer pads.

2. The damping device of claim 1 in which the weight member has a center of gravity located in relation to the clamp arm at an angle to the vertical in the range of 40° to 50°.

3. The damping device of claim 1 in which the suspension system comprises two pairs of elastomer pads, with the pads of each pair being diametrically opposed to one another.

* * * * *